United States Patent

Wachenheim

[15] 3,682,461
[45] Aug. 8, 1972

[54] LIQUID SPRING
[72] Inventor: Howard W. Wachenheim, Marietta, Ga.
[73] Assignee: The Citizens and Southern National Banks
[22] Filed: Feb. 4, 1970
[21] Appl. No.: 8,677

[52] U.S. Cl. ...................267/31, 213/43, 188/317, 188/322, 267/64
[51] Int. Cl. ...................B60g 11/46, B61g 11/12
[58] Field of Search............267/31, 34, 65, 64, 64 A; 213/43, 45; 188/311, 316, 317, 322, 284

[56] References Cited

UNITED STATES PATENTS

| | | | |
|---|---|---|---|
| 1,198,829 | 9/1916 | Edwards | 188/316 |
| 1,891,977 | 12/1932 | Gould | 267/34 |
| 2,953,810 | 9/1960 | Hall | 188/317 |
| 3,350,087 | 10/1967 | Haanes | 188/316 |
| 2,316,924 | 4/1943 | Whisler, Jr. | 188/317 |
| 2,333,096 | 11/1943 | Dowty | 267/34 |
| 2,093,062 | 9/1937 | Watson | 267/34 |
| 3,256,005 | 6/1966 | Taylor | 267/64 A |
| 3,366,379 | 1/1968 | McNally | 267/65 |

Primary Examiner—Drayton E. Hoffman
Attorney—Cushman, Darby & Cushman

[57] ABSTRACT

A liquid spring constructed using a sliding shock or piston head member on a piston rod and incorporating spring means under the piston head. This liquid spring includes an outer cylinder or housing closed at the top with a threaded in closure head containing a filler plug. Beneath this member is a first seal to provide a leak proof container at that end. The other end of the cylinder or housing is constructed so as to provide an integral mass that formsa portion of a second closure means. This mass has a hole through which the piston rod protrudes and the hole is shaped to accept a second seal that provides the final sealing of the housing. Beneath this seal is a bushing or bearing which is contained in the cylinder mass and which surrounds the piston rod.

10 Claims, 1 Drawing Figure

PATENTED AUG 8 1972 3,682,461
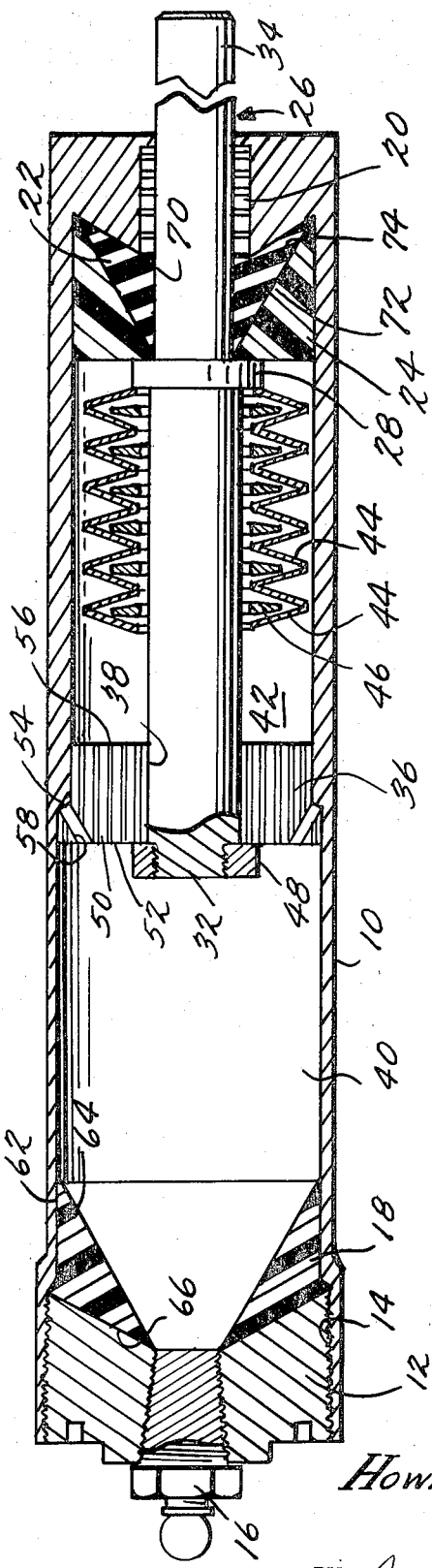
INVENTOR
HOWARD W. WACHENHEIM
BY Cushman, Darby, Cushman
ATTORNEYS

LIQUID SPRING

This invention relates to a new type of liquid spring the function of which is to provide for limited rapid extension and a softer initial compression.

The present liquid springs, used in applications where relatively high load factors are experienced, have not satisfactorily reduced initial loading and unloading shocks, to provide a soft feel, and still provide for total energy absorption. The state of the art liquid springs use a fixed shock or piston head on the piston rod, have fixed orifices and fixed clearances between the shock head and the cylinder wall. This provides for predictable energy absorption in a relatively efficient manner but cannot reduce the initial compression shock without compromising the energy absorption capability. This fixed head, because of the fixed orifice and fixed wall clearance with the cylinder wall also has the fault of having a relatively slow extension cycle which when used in a vehicle suspension system causes the vehicle to pitch and/or roll beyond that point which is comfortable to the passengers. In addition, the seals for known successful liquid springs are generally quite complex in shape and are relatively expensive to manufacture due to the close tolerances required for sealing and because of the complex shape.

These and other problems and disadvantages associated with the prior art are overcome by the invention disclosed herein by providing a means for softening the initial compression shock and allowing a high rate of initial extension, when under load. The softening of the initial shock due to rapid compression is accomplished by inserting spring means between the movable piston or shock head and a shoulder on the piston rod. As the piston rod experiences an excursion in the compressive mode the spring means contracts and causes the shock head to move with a slower initial acceleration, thereby reducing the load factor experienced by the structure in which the liquid spring is mounted and consequently giving a lower shock feel to the passengers in the vehicle. The rapid extension is achieved by having the piston rod protrude through the shock or piston head during all normal modes of operation in contact with the ground. When a void in the ground (such as a hole or step) is encountered, the piston rod has the capability of extending for a limited stroke at a faster rate than could be attained with a unit having the shock head permanently attached to the piston rod, thereby reducing the undesirable pitching or rolling motion of the vehicle. The shock head is designed to give a high efficiency to the liquid spring in absorbing large amounts of energy while keeping the shock force at a relatively low peak. The head has a base portion with a surface face and further has a row of open-ended, fluid-passing holes (orifices) that are circular in location in the surface face when viewed from the top. The individual axes of the holes or apertures are slanted outwardly towards the bottom of the head (toward the cylinder wall and toward the perimeter of the base portion) and have a perpendicularity to an angled surface of the head at the penetration point of the holes. From this angled surface there is a second integral portion or cylindrical shape the depth of which is approximately one-sixth to one-third the diameter of the shock head.

The function of the piston head structure is to aid the passage fluid from the first cavity or chamber on the top side of the shock head, as normally oriented, to the second cavity or chamber on the lower side of the shock head by causing a pressure decrease on the lower side of the shock head between the shock head and the cylinder wall. This results in a faster flow of fluid, and consequently when a number of orifices at the proper angle are used and when clearances are used between the shock head and the cylinder wall, depending upon the loads to be encountered and the size of the liquid spring, the pressure on the top side of the shock head is relatively constant so as to provide a unit having a predictable maximum shock force.

The seals (both upper and lower) play an important role in the operation of the liquid spring. Because of the relatively high internal working pressures experienced, most 0 ring and other similar seals tend to leak and therefore give prior art liquid springs a short operating life. After much testing it has been shown that for best sealing and longer life the surface of the seal that is exposed to the fluid in the liquid spring should have an angle of 30° or less with the surface to be sealed. This has been established by the prior art. However, the seals of this invention are an advance over prior art seals because they have the least number of surfaces for ease of manufacturing and for the most inexpensive cost, and are designed to mate with metal surfaces to properly achieve the desired angles for long operating life and best sealing.

Accordingly, an object of the present invention is the provision of a liquid spring for softening the initial compression shock and for allowing a high rate of initial extension when under load.

Another object is to provide a liquid spring which significantly reduces the undesirable pitching or rolling motion of the vehicle (aircraft) to which it is attached.

A further object of the invention is the provision of a liquid spring which rapidly extends when a hole or step in the ground is encountered so as to avoid undesirable pitching or rolling of the vehicle.

Other objects and features of the invention will become apparent to those of ordinary skill in the art as the disclosure is made in the following description of a preferred embodiment of the invention as illustrated in the accompanying sheet of drawing in which:

The FIGURE shows a side view, partly in section, of a preferred embodiment of the invention. With reference now to the FIGURE there is shown a housing or cylinder 10 having first and second end portions. A first closure means is mounted for closing the first end portion of the housing and includes a closure head 12 which is threaded to be affixed to the threaded interior wall 14 of the housing 10. A filler plug 16 is threadedly engaged within the closure head 12 while first seal 18 is located contiguous with the interior wall of the housing 10 and with the closure head 12 to provide a leak-proof closure at the first end of the housing.

A second closure means is located at the second end portion of the housing 10 and the second closure means includes a bearing 20 contiguous with the housing 10. The second closure means also includes a second seal 22 contiguous with the housing 10 and a stop member 24 engaging the second seal 22 and the housing for limiting the extended movement of the piston rod 26 when shoulder member 28 contacts the stop member 24.

The piston rod member 26 has a first end 32 and a second end 34. A piston head member or shock head member 36 having a piston rod receiving aperture 38 therein is in slideable spaced relationship with the housing 10 and is in slideable engagement with the piston rod 26 so that a first chamber 40 is formed within the housing between the piston head member 36 and the first end portion of the housing. In addition, the piston head member 36 forms a second chamber 42 within the housing and between the piston head member and the second end portion of the housing. Spring means including a plurality of Belleville washers 44 as well as at least a first washer 46 having an increasing thickness from the outside diameter to the inside diameter thereof are mounted on the piston rod member and within the second chamber 42 for contacting the piston head member 36 when predetermined loads are applied to the piston rod member 26. The Belleville washers are located on each side of the first washer 46 with the concave portions of the Belleville washers facing the first washer.

The piston head member 36 is kept from sliding off of the first end 32 of the piston rod 26 by means of a retaining nut or other similar device 48 which can be threaded onto the end 32 of the piston rod 26. In addition, the piston or shock head member 36 has a base portion 50 which is partially defined by a surface face 52. The base portion is also partially defined by an angled surface 54 which joins the perimeter of the base portion with a second portion 56 of the piston head. The base portion 50 has a plurality of open-ended, fluid-passing apertures 58 therein with the open ends of the apertures which are farthest from the surface face 52 being closely adjacent to the interior wall of the housing 10 and wherein the apertures are angled outwardly from the surface face 52 toward the perimeter of the base portion 50. The piston head member does not completely seal the first chamber 40 from the second chamber 42 but a small space exists between the perimeter of the piston head and the interior wall of the housing 10 through which a compressible fluid, for example dimethyl siloxane, passes.

The seals 18 and 22 of this invention enable the liquid spring to experience relatively high internal working pressures and provide for long operating life of the spring because these seals are designed to effectively avoid leakage of the compressible fluid from the interior of the spring. Both of the seals of this invention are simply designed with the least number of surfaces for ease of manufacturing and for inexpensive cost. The first seal 18 includes a first substantially cylindrical surface 62 which is placed in contact with the interior surface of the housing 10. A second substantially truncated conical surface 64 joins the first surface at an angle no greater than 30° while a third surface in contact with with the closure head 12 joins the second surface at an angle no greater than 30° and also joins the first surface. The second seal 22 is similarly constructed but includes a first substantially cylindrical surface 70 in slideable contact with the piston rod member 26. A second substantially truncated conical surface 72 joins the surface 70 at an angle no greater than 30° and is contiguous with the stop member 24. A third surface 74 joins the surface 72 at an angle no greater than 30° and also joins the first surface 70.

In the operation of the liquid spring of this invention the piston rod 26 when under normal compressive loads, such as when the aircraft or vehicle is taxiing, is moved with respect to the piston head 36 so that the first end 32 of the piston rod extends into the first chamber 40 and the spring means or washers 44 and 46 are forced into contact with the piston head 36 so that the washers ride between the piston head and the shoulder portion 28. Thus, the piston rod 26 is slideable with respect to the piston head 36 so that the piston head is actually free-floating within the housing. When the vehicle strikes a bump or raised portion of the ground the shock due to the compressive force created in the piston rod 26 is absorbed by the spring action of the Belleville washers 44. This compression of the washers causes the piston or shock head 36 to move with a slower initial acceleration than would otherwise be the case so that the load factor experienced by the structure in which the liquid spring is mounted is reduced with a consequent reduction in the shock transmitted to the vehicle and to the passengers therein.

Conversely, if the vehicle encounters a hole or void in the ground rapid extension of the piston rod 26 is accomplished because the piston rod extends through the piston head 36 during all normal modes of operation of the vehicle when the vehicle is in contact with the ground. Thus, the piston rod 26 has the capability of extending for a limited stroke at a much faster rate than could be attained with a unit having the piston head permanently attached to the piston rod. Therefore, when a hole is encountered the piston rod is able to rapidly extend into the hole so as to reduce the undesirable pitching or rolling motion which would otherwise be experienced by the vehicle.

In addition to providing a soft and cushioned ride the liquid spring of this invention is designed to provide for the efficient absorption of large amounts of energy while keeping the shock force at a relatively low peak. Such large amounts of energy must be absorbed when an aircraft lands, for example. The shock head or piston head 36 is designed with a plurality of open-ended, fluid-passing apertures 58 which are slanted outwardly from the surface face 52 toward the angled surface 54.

When the aircraft lands and large shock forces are applied to the piston rod 26, these forces are transmitted via the washers 44 against the piston head 36. This causes movement of the piston or shock head into the first chamber 40 and as this occurs the compressible fluid flows through the apertures 58 to impinge upon the inner surface of the housing 10 which is adjacent to the apertures. Thus, the fluid which is also passing between the piston head 36 and the housing 10 increases flow because of the reduced pressure which now exists adjacent the exit openings of the apertures 58 and adjacent to the angled surface 54. This increased flow rate of the fluid between the piston head and the housing, in turn, reduces the pressure therebetween so that the movement of the piston head is facilitated. In this way the pressure against the surface face 52 of the shock head 36 is maintained relatively constant so as to provide a predictable maximum shock force.

This invention provides for a unique liquid spring which utilizes a unique piston head and seals to provide for the high efficiency absorption of large amounts of energy while keeping the shock force at a relatively low peak. The spring means or washers 44 provide a soft and cushioned ride while the aircraft is moving on the ground while the design of the piston head 36 enables the liquid spring to absorb large amounts of energy while at the same time maintaining the pressure against the surface face 52 relatively constant so as to provide for a predictable maximum shock force on the spring.

Obviously many modifications and variations of the present invention are possible in light of the above teachings. It is therefore to be understood that within the scope of the appended claims the invention may be practiced otherwise than as specifically described.

What is claimed is:

1. A liquid spring assembly comprising:
   a housing having first and second end portions;
   first closure means mounted for closing said first end portion of said housing;
   second closure means mounted for closing said second end portion of said housing;
   a piston rod member having first and second ends and slideably extending through said second end portion of said housing;
   a piston head member slideably mounted on said piston rod member;
   said piston head member being in slideable engagement with said housing and forming a first chamber within said housing between said piston head member and said first end portion of said housing and forming a second chamber within said housing between said piston head member and said second end portion of said housing; and
   spring means mounted on said piston rod member and within said second chamber for contacting said piston head member when predetermined loads are applied to said piston rod member, said spring including a plurality of washer members which include at least one first washer member having an increasing thickness from its outside diameter to its inside diameter and at least two Belleville washers one located on each side of said first washer and arranged with their concave portions facing said first washer member so as to form a compressible stack of such members.

2. A liquid spring assembly as in claim 1 wherein said piston head member has a piston rod receiving aperture therein and wherein said piston head member further includes:
   a base portion having a surface face and having a plurality of open-ended fluid-passing apertures therein, each of said fluid-passing apertures being angled outwardly toward the perimeter of said base portion from said surface face.

3. A liquid spring assembly as in claim 2 wherein the open ends of said fluid-passing apertures farthest from said top face are closely adjacent to said housing whereby the flow of fluid therethrough from said first chamber to said second chamber causes a reduction in fluid pressure adjacent the perimeter of said head member and adjacent said housing to facilitate increased flow of fluid between said head member and said housing from said first to said second chamber.

4. A liquid spring assembly as in claim 3 wherein said first closure means includes:
   a closure head affixed to and within said housing;
   a filler plug affixed within said closure head; and
   a first seal contiguous with said housing and with said closure head.

5. A liquid spring assembly as in claim 4 wherein said first seal includes:
   a first substantially cylindrical surface in contact with said housing;
   a second substantially truncated conical surface joining said first surface at an angle no greater than 30°; and
   a third surface joining said second surface at an angle no greater than 30° and joining said first surface;
   said third surface being in contact with said closure head.

6. A liquid spring assembly as in claim 5 wherein said second closure means includes:
   a bearing contiguous with said housing and slideably engaging said piston rod member;
   a second seal contiguous with said housing and slideably engaging said piston rod member; and
   a stop member engaging said second seal and said housing.

7. A liquid spring assembly as in claim 6 wherein said second seal includes:
   a first substantially cylindrical surface in slideable contact with said piston rod member;
   a second substantially truncated conical surface joining said last-mentioned first surface at an angle no greater than 30° and in contact with said stop member; and
   a third surface joining said last-mentioned second surface at an angle no greater than 30° and joining said last-mentioned first surface.

8. A liquid spring assembly as in claim 7 wherein said piston rod member includes a shoulder member for engaging said stop member to limit the extension of said piston rod member.

9. A liquid spring assembly as in claim 8 wherein said piston head member further includes:
   a second portion integral with said base portion; and
   an angled surface joining the perimeter of said base portion and said second portion.

10. A liquid spring assembly as in claim 9 wherein said fluid-passing apertures exit along said angled surface.

* * * * *